US009554030B2

(12) United States Patent
Li et al.

(10) Patent No.: US 9,554,030 B2
(45) Date of Patent: Jan. 24, 2017

(54) MOBILE DEVICE IMAGE ACQUISITION USING OBJECTS OF INTEREST RECOGNITION

(71) Applicant: Yahoo! Inc., Sunnyvale, CA (US)

(72) Inventors: Jia Li, Santa Clara, CA (US); Haojian Jin, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 47 days.

(21) Appl. No.: 14/500,911

(22) Filed: Sep. 29, 2014

(65) Prior Publication Data

US 2016/0094774 A1    Mar. 31, 2016

(51) Int. Cl.
*H04N 5/232* (2006.01)
*G06K 9/32* (2006.01)

(52) U.S. Cl.
CPC ........ *H04N 5/23212* (2013.01); *G06K 9/3233* (2013.01); *H04N 5/23216* (2013.01); *H04N 5/23293* (2013.01)

(58) Field of Classification Search
CPC ............ H04N 5/23212; H04N 5/23216; H04N 5/23293; G06K 9/3233
USPC ...................... 348/345, 346, 222.1
See application file for complete search history.

(56) References Cited

U.S. PATENT DOCUMENTS

| 8,466,977 B2 * | 6/2013 | Yoshida | H04N 5/232 348/222.1 |
| 2003/0071908 A1 * | 4/2003 | Sannoh | H04N 5/23212 348/345 |
| 2008/0316325 A1 * | 12/2008 | Nakahara | G06K 9/00255 348/222.1 |
| 2010/0194903 A1 * | 8/2010 | Kawashima | H04N 5/23293 348/222.1 |
| 2013/0038759 A1 * | 2/2013 | Jo | H04N 5/2256 348/240.99 |
| 2013/0135442 A1 * | 5/2013 | Kwon | H04N 5/23212 348/47 |

(Continued)

OTHER PUBLICATIONS

Hou et al., "Saliency Detection: A Spectral Residual Approach", dated 2007, 8 pages.

(Continued)

*Primary Examiner* — Nhan T Tran
*Assistant Examiner* — Chan Nguyen
(74) *Attorney, Agent, or Firm* — Hickman Palermo Becker Bingham LLP; Edward A. Becker

(57) ABSTRACT

An approach is provided for acquiring images with camera-enabled mobile devices using objects of interest recognition. A mobile device is configured to acquire an image represented by image data and process the image data to identify a plurality of candidate objects of interest in the image. The plurality of candidate objects of interest may be identified based upon a plurality of low level features or "cues" in the image data. Example cues include, without limitation, color contrast, edge density and superpixel straddling. A particular candidate object of interest is selected from the plurality of candidate objects of interest and a graphical symbol is displayed on a screen of the mobile device to identify the particular candidate object of interest. The particular candidate object of interest may be located anywhere on the image. Passive auto focusing is performed at the location of the particular candidate object of interest.

18 Claims, 11 Drawing Sheets

(56) References Cited

U.S. PATENT DOCUMENTS

2014/0226858 A1* 8/2014 Kang ................ H04N 5/23212
                                                    382/103

OTHER PUBLICATIONS

Felzenszwalb et al., "Efficient Graph-Based Image Segmentation", dated 2004, 26 pages.
Alexe et al.,"Measuring the Objectness of Image Windows", dated 2012, 14 pages.

* cited by examiner

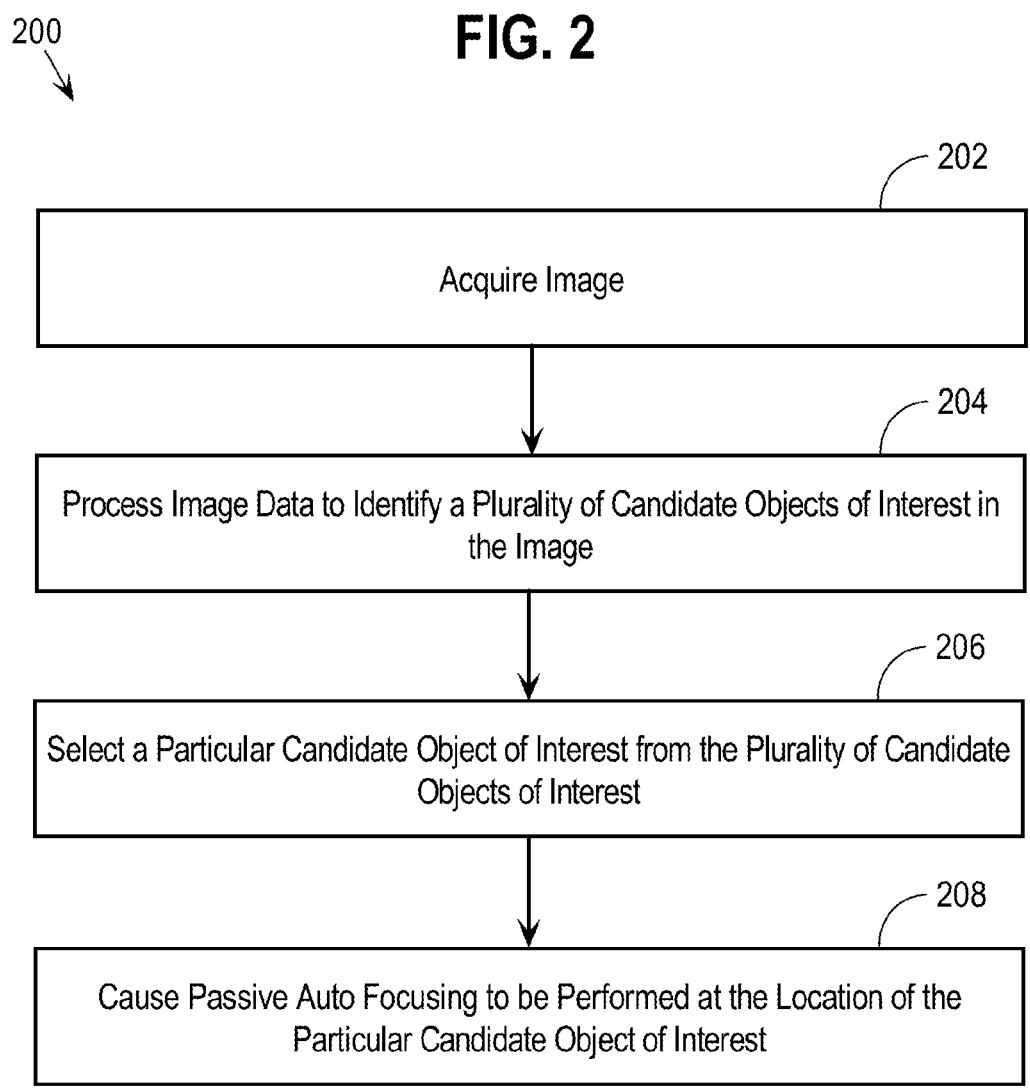

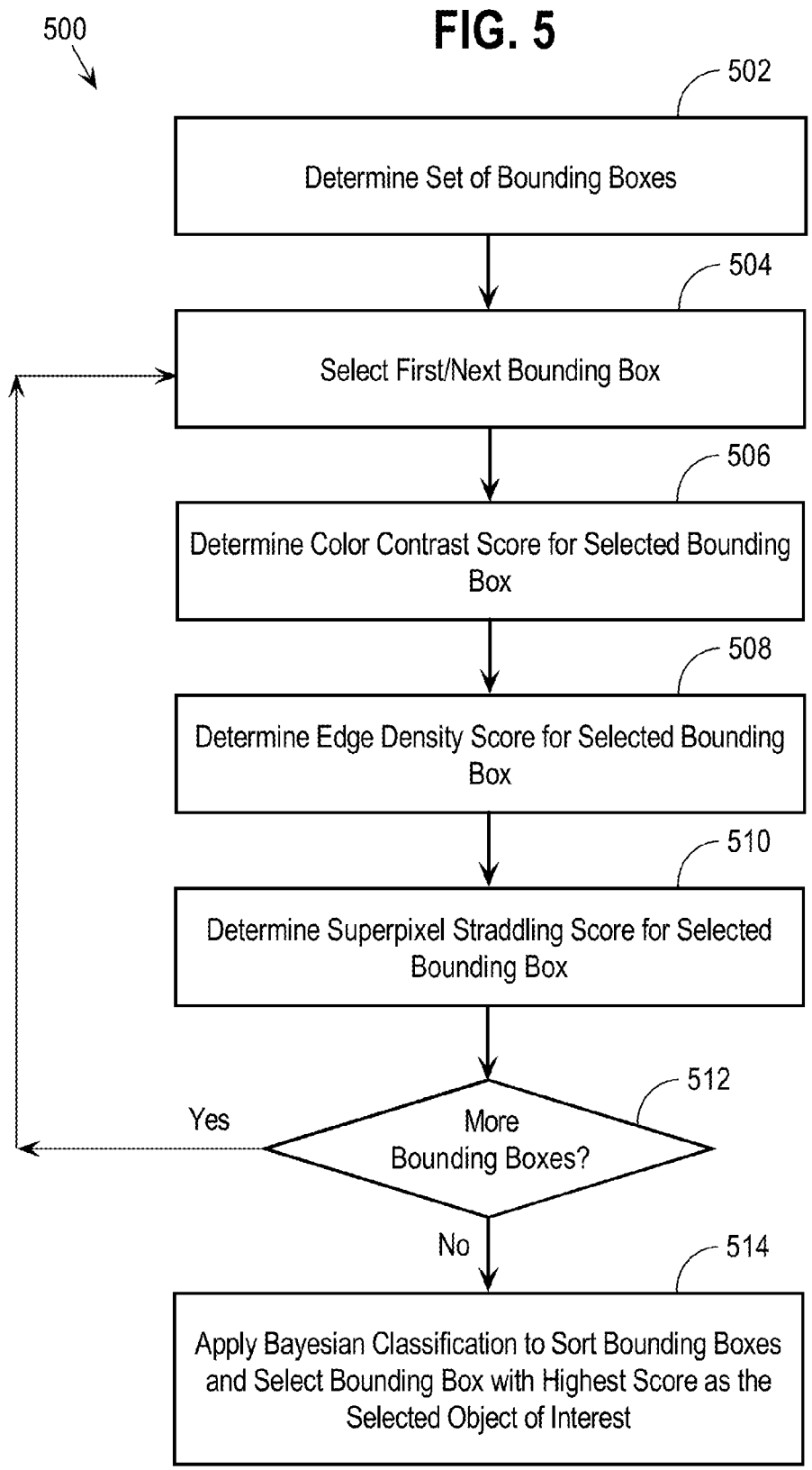

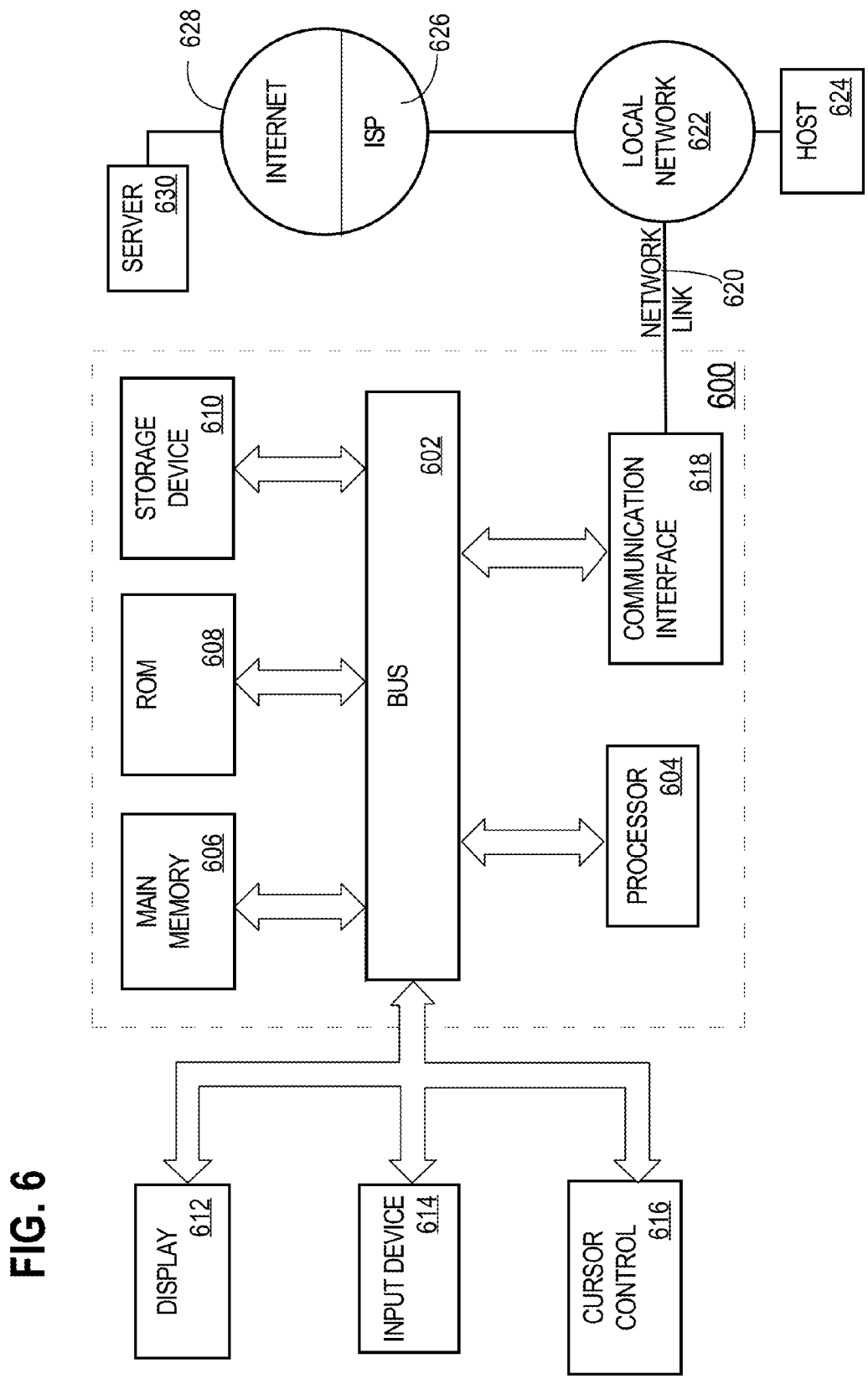

MOBILE DEVICE IMAGE ACQUISITION USING OBJECTS OF INTEREST RECOGNITION

FIELD

Embodiments relate generally to acquiring images using camera-enabled mobile devices, and more specifically, to an approach for acquiring images using camera-enabled mobile devices using objects of interest recognition.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many mobile devices, such as smartphones, tablet computing devices, personal digital assistants and laptop computers include a camera allow users to easily and quickly acquire photos and then share the photos with others via email, messaging and social network services. Despite the convenience provided by mobile devices equipped with a camera, there are some drawbacks. Unlike conventional cameras that allow a user to manually change the focus, or active focus cameras that use a separate sensor to measure focus, many mobile devices use passive auto-focusing to determine the correct focus without any user intervention. Passive auto-focussing generally involves capturing and evaluating images at different lens positions and selecting a lens position that provides the best sharpness, i.e., where adjacent pixels have the greatest difference in intensity, regardless of the image content. Passive auto-focussing does not work well with blurred images because the difference of intensity of adjacent pixels in blurred images is generally less than in clear images. It is not uncommon for users to experience delays and blurred images as they wait for the passive auto-focussing to complete and even after completed, an object of interest to a user may not be in the focus area. On many cameras and mobile devices, the default focus area is fixed at the center of the display and visually indicated by a focus area symbol, such as a rectangle, circle, etc., superimposed on the image. This forces a user to move or orient the mobile device so that an object of interest is within the focus area, as indicated by the focus area symbol, and then again wait for the passive auto-focus process to complete. Alternatively, some mobile devices allow a user to tap the screen at the location of an object of interest to move the focus area, and the corresponding focus area symbol, to that location. This avoids having to re-orient the mobile device so that the object of interest is in the center of the display, but requires that the user tap the screen.

BRIEF DESCRIPTION OF THE DRAWINGS

In the figures of the accompanying drawings like reference numerals refer to similar elements.

FIG. 2 is a flow diagram that depicts an approach for acquiring images using camera-enabled mobile devices using objects of interest recognition.

FIG. 5 is a block diagram that depicts various states of configuration data during processing via bulk editing functions.

FIG. 6 is a block diagram of a computer system on which embodiments may be implemented.

DETAILED DESCRIPTION

In the following description, for the purposes of explanation, numerous specific details are set forth in order to provide a thorough understanding of the various embodiments. It will be apparent, however, to one skilled in the art that the embodiments may be practiced without these specific details. In other instances, well-known structures and devices are shown in block diagram form in order to avoid unnecessarily obscuring the embodiments. Various aspects of embodiments are described hereinafter in the following sections:

I. OVERVIEW
II. ARCHITECTURE
III. USING OBJECTS OF INTEREST TO SELECT A FOCUS LOCATION
IV. DETERMINING CANDIDATE OBJECTS OF INTEREST
V. IMPLEMENTATION MECHANISMS

I. Overview

An approach is provided for acquiring images with camera-enabled mobile devices using objects of interest recognition. A mobile device is configured to acquire an image represented by image data and process the image data to identify a plurality of candidate objects of interest in the image. The plurality of candidate objects of interest may be identified based upon a plurality of low level features or "cues" in the image data. Example cues include, without limitation, color contrast, edge density and superpixel straddling. A particular candidate object of interest is selected from the plurality of candidate objects of interest and a graphical symbol is displayed on a screen of the mobile device to identify the particular candidate object of interest. The particular candidate object of interest may be located anywhere on the image. Passive auto focusing is performed at the location of the particular candidate object of interest. The approach described herein may provide a more favorable user experience by focusing the image at the location of the particular candidate object of interest, rather than only at a fixed location on the display of the mobile device, such as the center of the display, which may not include an object of interest to a user. The approach may be repeated continuously, periodically, or in response to a user selection on the mobile device to allow new candidate objects of interest to be identified, for example, after the mobile device has been moved or reoriented. In addition, a user may select another location on the display that may, for example, contain an alternative object of interest to the user, and passive auto focusing is performed at other location selected by the user.

II. Architecture

Figure 1:
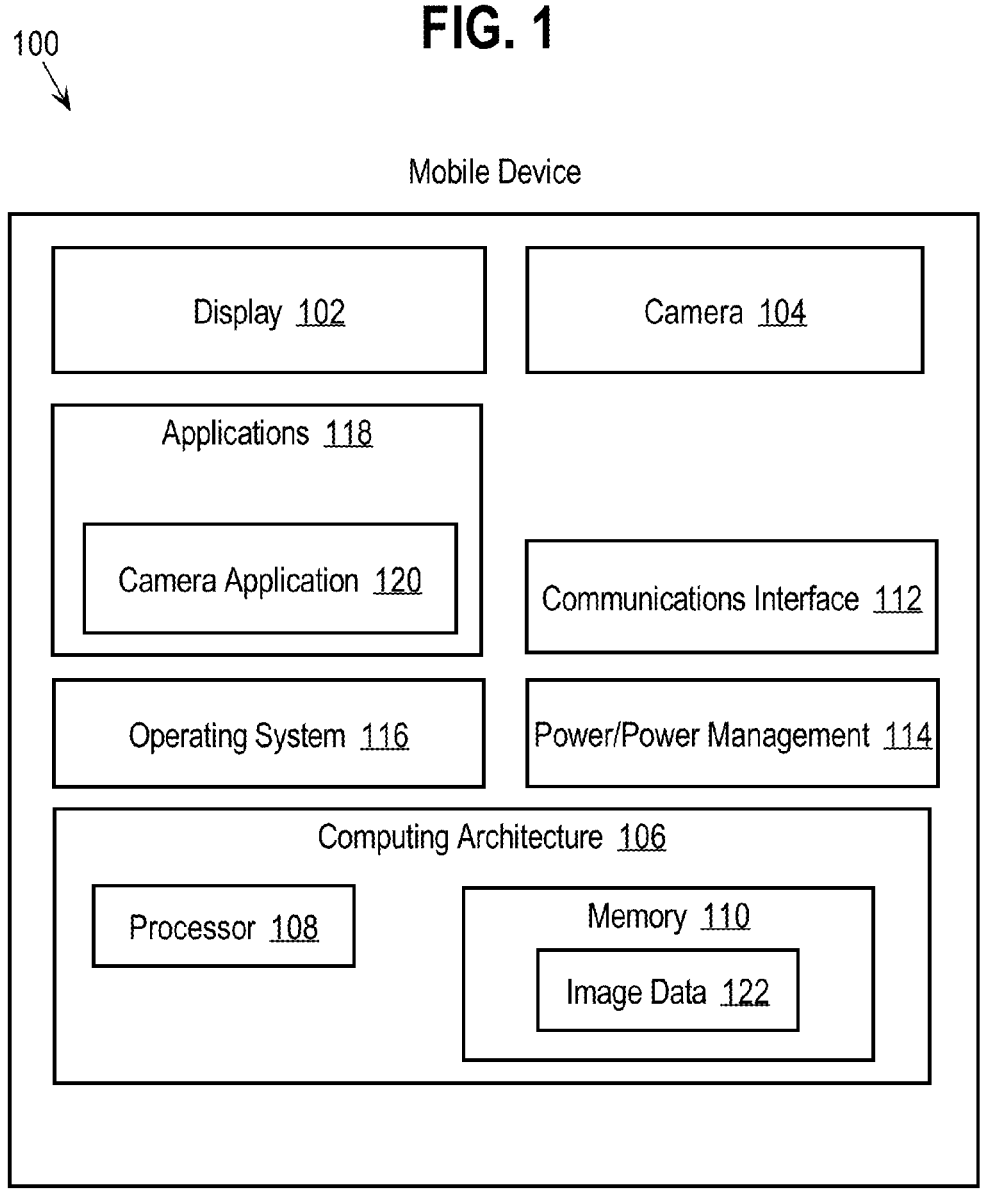
FIG. 1 depicts an example mobile device on which embodiments may be implemented.

FIG. 1 depicts an example mobile device 100 on which embodiments may be implemented. Mobile device 100 may be any type of mobile device and examples of mobile device 100 include, without limitation, a smart phone, a camera, a tablet computing device, a personal digital assistant or a laptop computer. In the example depicted in FIG. 1, mobile device 100 includes a display 102, a camera 104, a computing architecture 106, a communications interface 112, a power/power management component 114, an operating system 116 and applications 118. Mobile device 100 may include various other components that may vary depending upon a particular implementation and mobile device 100 is not limited to a particular set of components or features. Mobile device 100 may also include manual controls, such as buttons, slides, etc., not depicted in FIG. 1, for performing various functions on mobile device, such as powering on/off or changing the state of mobile device 100 and/or display 102, or for acquiring photos.

Display 102 may be implemented by any type of display that displays images and information to a user and may also be able to receive user input and embodiments are not limited to any particular implementation of display 102. Mobile device 100 may have any number of displays 102, of similar or varying types, located anywhere on mobile device 100. Camera 104 may be any type of camera and the type of camera may vary depending upon a particular implementation. As with display 102, mobile device 100 may be configured with any number of cameras 104 of similar or varying types, for example, on a front and rear surface of mobile device 100, but embodiments are not limited to any number or type of camera 104.

Computing architecture 106 may include various elements that may vary depending upon a particular implementation and mobile device 100 is not limited to any particular computing architecture 106. In the example depicted in FIG. 1, computing architecture includes a processor 108 and a memory 110. Processor 108 may be any number and types of processors and memory 110 may be any number and types of memories, including volatile memory and non-volatile memory, that may vary depending upon a particular implementation. Computing architecture 106 may include additional hardware, firmware and software elements that may vary depending upon a particular implementation.

Communications interface 112 may include computer hardware, software, or any combination of computer hardware and software to provide wired and/or wireless communications links between mobile device 100 and other devices and/or networks. The particular components for communications interface 112 may vary depending upon a particular implementation and embodiments are not limited to any particular implementation of communications interface 112.

Power/power management component 114 may include any number of components that provide and manage power for mobile device 100. For example, power/power management component 114 may include one or more batteries and supporting computer hardware and/or software to provide and manage power for mobile device 100.

Operating system 116 executes on computing architecture 106 and may be any type of operating system that may vary depending upon a particular implementation and embodiments are not limited to any particular implementation of operating system 116. Operating system 116 may include multiple operating systems of varying types, depending upon a particular implementation. Applications 118 may be any number and types of applications that execute on computing architecture 106 and operating system 116. Applications 118 may access components in mobile device 100, such as display 102, camera 104, computing architecture 106, communications interface 112, power/power management component 114 and other components not depicted in FIG. 1, via one or more application program interfaces (APIs) for operating system 116. Applications 118 may provide various functionality that may vary depending upon a particular application and embodiments are not limited to applications 118 providing any particular functionality. Common non-limiting examples of applications 118 include social media applications, navigation applications, telephony, email and messaging applications, and Web service client applications. In the example depicted in FIG. 1, applications 118 include a camera application 120.

III. Using Objects of Interest to Select a Focus Location

FIG. 2 is a flow diagram 200 that depicts an approach for acquiring images with camera-enabled mobile devices using objects of interest recognition. The approach depicted in flow diagram 200 may be initiated, for example, in response to a user selecting a camera or photo mode for mobile device. For example, a user may select a graphical icon displayed on display 102 or a manual control provided on mobile device 100 to initiate the camera mode.

In step 202, an image is acquired. For example, camera application 120 may use camera 104 to acquire an image represented by image data. The image data may be stored in memory 110 as image data 122. The image acquired by camera 104 does not have to be in focus and may be a blurry image. According to one embodiment, the image is acquired prior to passive auto focusing being performed because, as described in more detail hereinafter, the techniques used to identify objects of interest in an image are effective even when the acquired image is not a focused image.

Figure 3A:
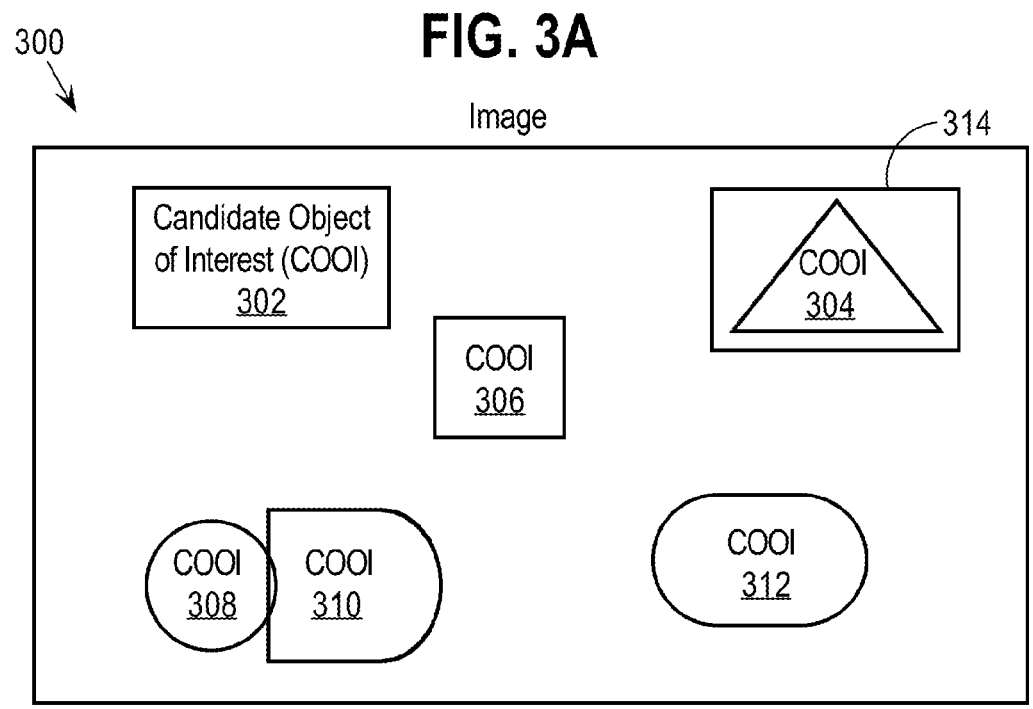
FIG. 3A is a block diagram that depicts an image and candidate objects of interest as determined by camera application after processing of image data for an image acquired by the camera.

In step 204, the image data is processed to identify a plurality of candidate objects of interest in the image. For example, as described in more detail hereinafter, camera application 120 may process the image data 122 to identify a plurality of candidate objects of interest in the image based upon one or more cues in the image data 122. FIG. 3A is a block diagram that depicts an image 300 and candidate objects of interest (COOI) 302-312 as determined by camera application 120 after processing of the image data 122 for the image 300 acquired by the camera 104. The candidate objects of interest 302-312 are physical objects in the image 300 that are determined to be of interest to a user of mobile device 100 and may include man-made and natural objects. As indicated by the different shapes in FIG. 3A, the objects of interest 302-312 may have different attributes and characteristics, including, without limitation, different size, shape, color, etc. In addition, the candidate objects of interest 302-312 may be physically separated or may overlapping, for example as depicted by objects of interest 308, 310.

In step 206, a particular candidate object of interest is selected from the plurality of candidate objects of interest. For example, camera application 120 may select candidate object of interest 304 as the particular candidate object of interest 314 from the plurality of candidate objects of interest 302-312 on the basis that candidate object of interest 304 has the best analysis score, relative to candidate objects of interest 302, 306-312, indicating that candidate object of interest 304 is most likely to be of interest to a user of mobile device 100. In the example depicted in FIG. 3A, the particular candidate object of interest 314 is not located in the center of display 102 and instead is located in the upper right corner of display 102. Thus, the particular candidate object of interest that is selected may be located anywhere in the image.

The particular candidate object of interest that has been selected may be visually identified on display 102 of mobile device 100 to visually indicate to a user of mobile device 100 that the point of focus will be at the location of the particular candidate object of interest 312. The manner in which the particular object of interest is visually identified may vary, depending upon a particular implementation, and embodiments are not limited to any particular manner for visually indicating the particular candidate object of interest 314. For example, a graphical symbol, such as a rectangle, circle, one or more arrows, etc., may be superimposed on display 102 at the location of the particular candidate object of interest 314. As another example, shading or a change in color or other attribute may be used to visually indicate the particular candidate object of interest 314.

In step 208, passive auto focusing is performed at the location of the particular candidate object of interest. For example, camera application 120 may cause passive auto focusing to be performed at a center location of particular candidate object of interest 312. This may include camera application 120 invoking a passive auto focusing process via one or more other applications 118, functionality provided by operating system 116 and camera 104, and providing the location of candidate object of interest 304 as the point of focus. Upon completion of the passive auto focusing, the particular candidate object of interest 312 will be in focus and the user may begin acquiring photos normally, for example, by selecting one or more graphical controls displayed on display 102 or by using manual controls provided on mobile device 100.

The visual identification of the particular candidate object of interest may have "stickiness" with respect to the particular candidate object of interest, meaning that the visual identification of the particular candidate object of interest may continue to visually identify the particular candidate object of interest as the mobile device 100 is moved. For example, suppose that the particular candidate object of interest 314 is identified by a graphical rectangle superimposed over the particular candidate object of interest 314. As the mobile device 100 is moved or reoriented and the particular candidate object of interest 314 moves within display 102, the rectangle may also be moved within display 102 to continue to identify the particular candidate object of interest 314.

Figure 3B:
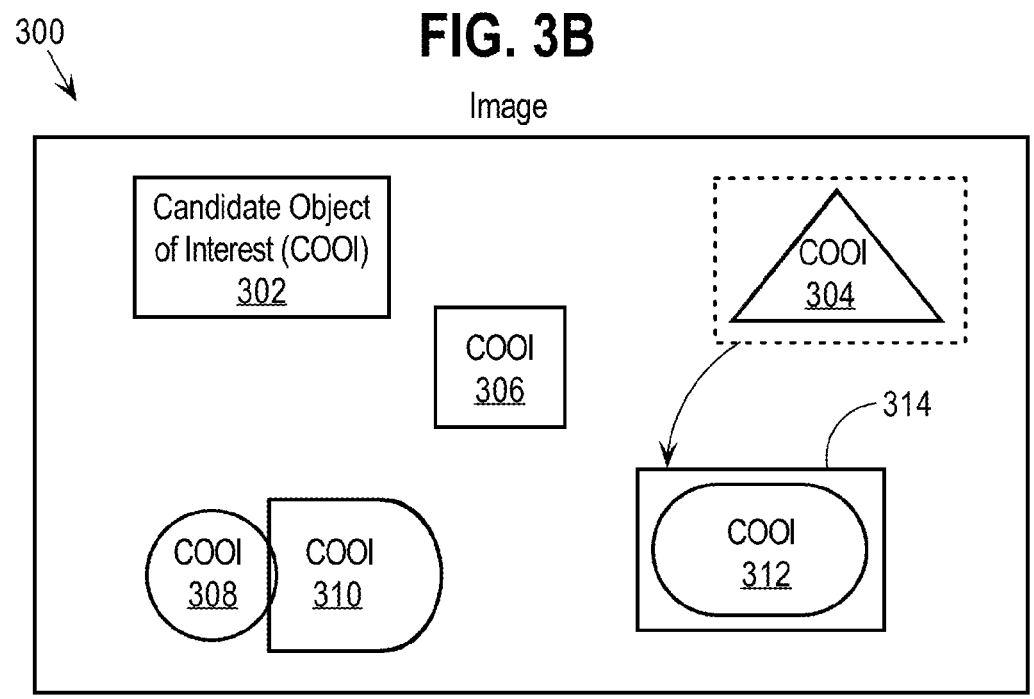
FIG. 3B depicts changing a visual identification of a particular candidate object of interest from one candidate object of interest to another candidate object of interest.

According to one embodiment, a user may manually change the particular candidate object of interest from the particular candidate object of interest automatically selected by camera application 120. For example, suppose that candidate object of interest 304 has been selected as the particular candidate object of interest 413, as previously described herein. Suppose further that a user of the mobile device 100 selects candidate object of interest 312, for example, by touching the display 102 at the location of candidate graphical object of interest 312 using a finger or a stylus. In response to the user selection of candidate object of interest 312, the visual identification of the particular candidate object of interest is changed from candidate object of interest 304 to candidate object of interest 312, as depicted in FIG. 3B. In addition, passive auto focusing may be again performed, but at the location of the new particular candidate object of interest, which in the present example is the location of candidate object of interest 312.

The process depicted in FIG. 2 may be iteratively performed. For example, the process depicted in FIG. 2 may be repeated continuously, repeated on a periodic basis, or repeated in response to a user selection of a graphical control displayed on display 102 or a manual control on mobile device 100. For example, a graphical control may be displayed on display 102 which, when selected, causes the process depicted in FIG. 2 to be repeated. This may be useful, for example, when a user initiates the camera mode on mobile device 100 and then after the particular candidate object of interest has been selected and the passive auto focusing process completed, the user moves or reorients mobile device 100 so that the particular candidate object of interest is no longer in the field of view of display 102. When the mobile device 100 is moving or being reoriented, repeating the process continuously may provide a more favorable user experience by refreshing the particular candidate object of interest 314 at the fastest rate, but will require more computational resources compared to repeating the process periodically, or in response to a user selection of a control.

Figure 4A:
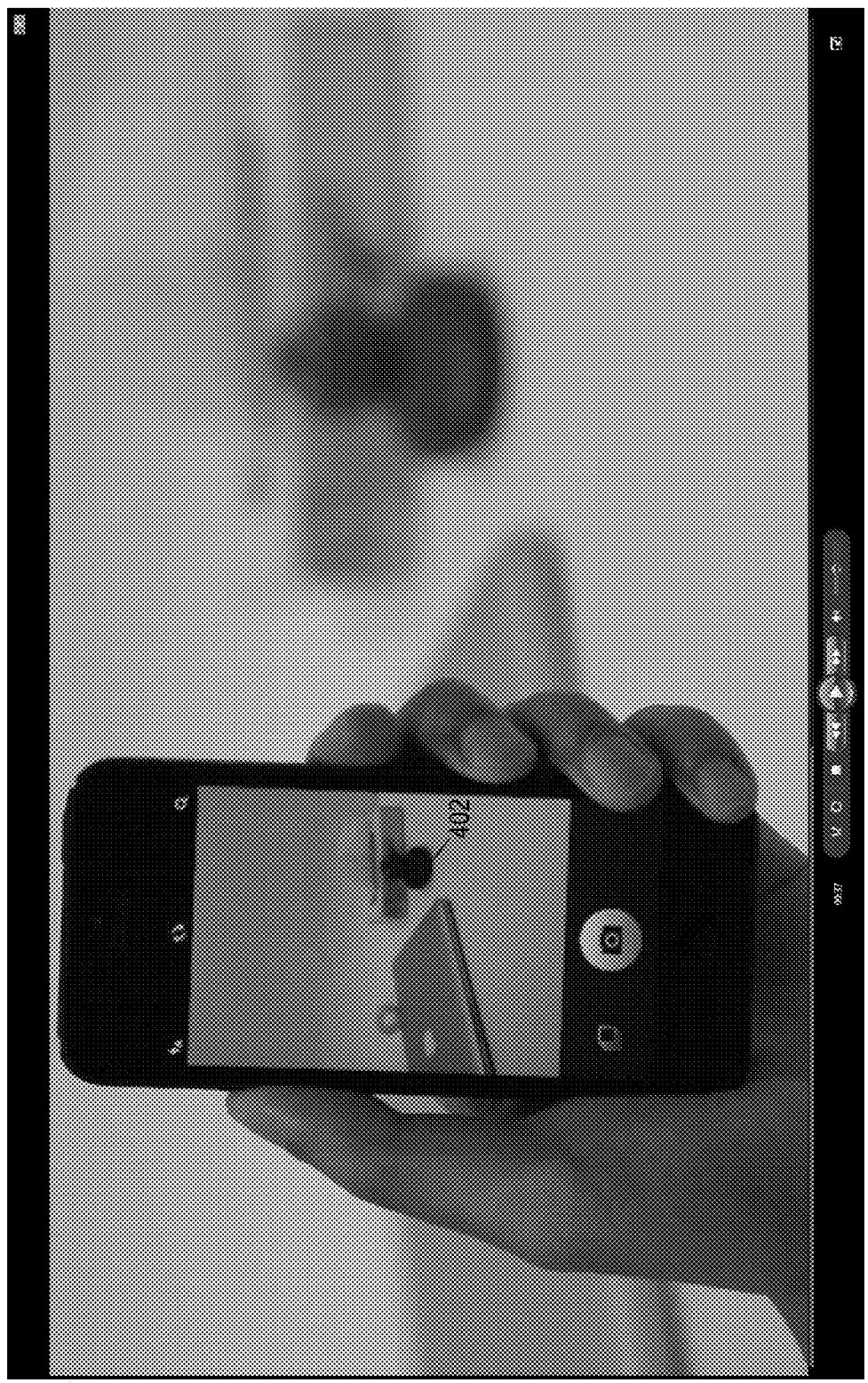
FIGS. 4A-4F depict an operational example of an approach for acquiring images with camera-enabled mobile devices using objects of interest recognition.

FIGS. 4A-4F depict an operational example of an approach for acquiring images with camera-enabled mobile devices using objects of interest recognition. FIG. 4A is a diagram 400 that depicts a user holding a mobile device, in the form of a smart phone. The user has selected an option on the smart phone to acquire an image using an application configured to acquire images using objects of interest recognition, in accordance with an embodiment. For example, the user may select a graphical icon associated with the application that is displayed on the screen of the smartphone. Initially, a preview of the image to be acquired is displayed on the smart phone. In this example, the preview of the image includes four objects on a plain background. The four objects include a laptop computer, a roll of tape, a box of tissues and a rubber duck 402.

Figure 4B:
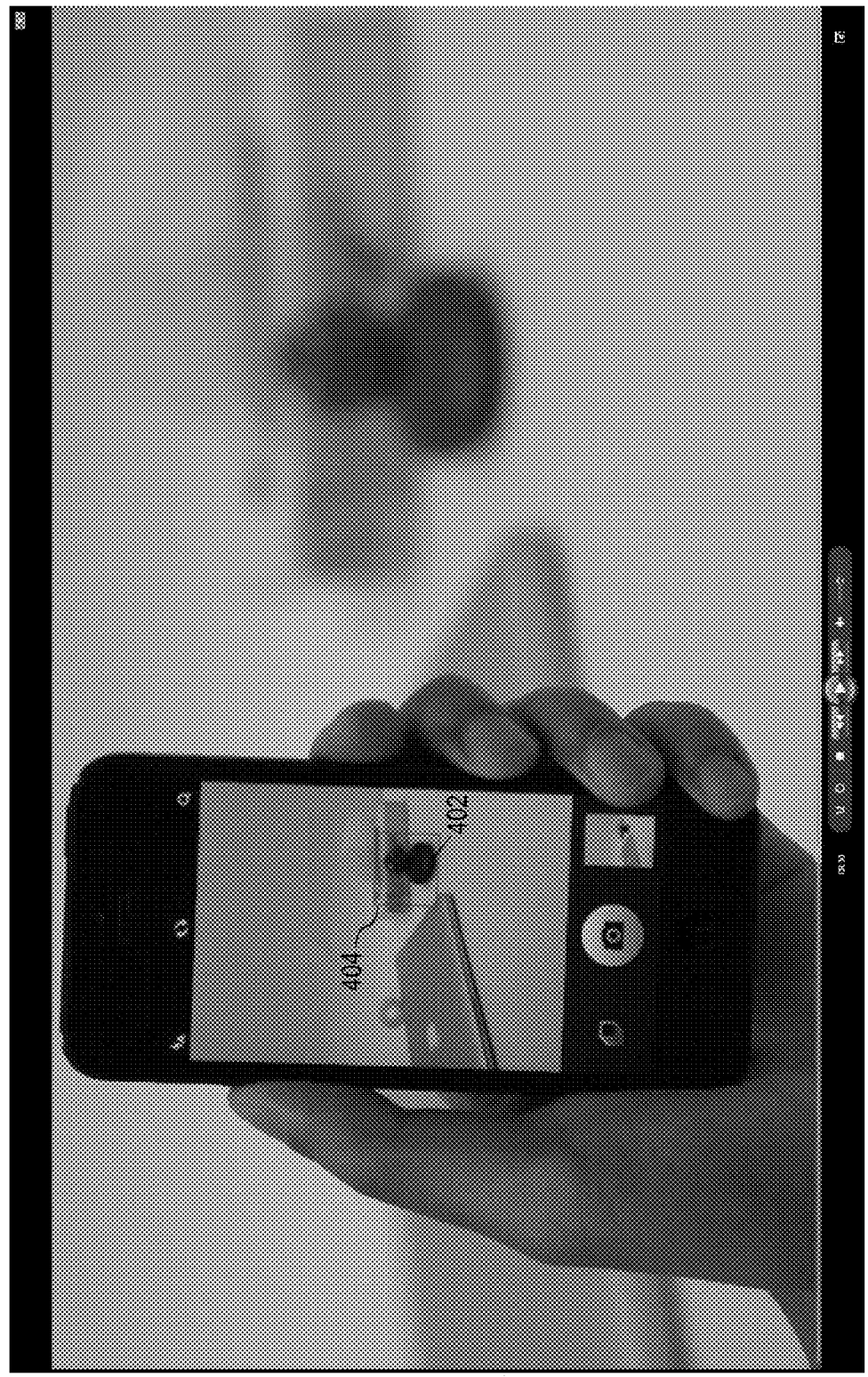

In FIG. 4B, the application automatically performs several steps. These include: 1) acquiring an initial image represented by image data; 2) analyzing the image data to identify a plurality of candidate objects of interest in the image; 3) selecting, from the plurality of candidate objects of interest, a particular candidate object of interest that is most likely to be of interest to the user; 4) displaying on the screen of the smart phone a graphical symbol to identify the particular candidate object of interest that was selected; and 5) performing passive auto focusing at the location of the particular candidate object of interest. As previously mentioned here, the initial image from which the plurality of candidate objects of interest is determined does not have to be a focused image, since the low level cues identified in the image data are effective regardless of whether the image is a focused image or not.

In the present example, a graphical symbol 404, in the form of a rectangle, is superimposed on the rubber duck 402 to visually identify the rubber duck 402 as the point of focus of the smartphone camera. The displaying on the screen of the smart phone of the graphical symbol 404 to identify the particular candidate object of interest that was selected (and the focus point of the camera) may be performed prior to, during, or after the passive auto focusing that is performed at the location of the particular candidate object of interest.

Figure 4C:
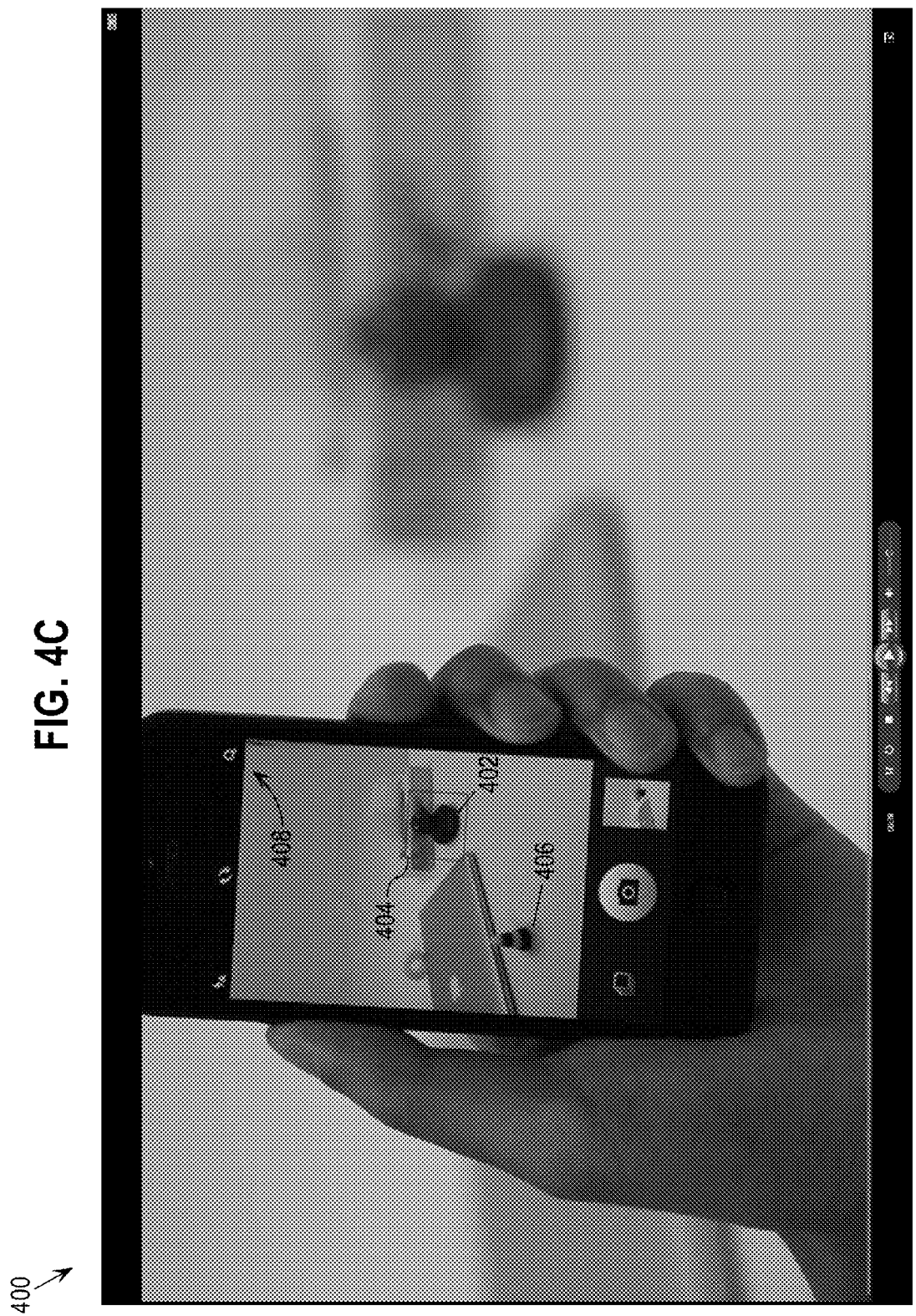

In FIG. 4C, a new object, in the form of a traffic cone 406, is added into the field of view of the camera on the smartphone. Steps 1) through 5) described above with respect to FIG. 4B are repeated to determine a new plurality of candidate objects of interest and to select a new particular candidate object of interest from the new plurality of candidate objects of interest. The repeating of steps 1) through 5) may be initiated automatically, after a specified time, or in response to a user request, for example, via a selection of a search button 408 in the upper right corner of the screen of the smartphone, a selection of another control on the smart phone, or selection of a graphical icon displayed on the screen of the smart phone. After repeating the process, any of the candidate objects of interest may be selected as the new particular candidate object of interest. The rubber duck 402 previously selected as the particular candidate object of interest may again be selected as the particular, i.e., the best, candidate object of interest. Alternatively another candidate object of interest may be selected as the best candidate object of interest.

Figure 4D:
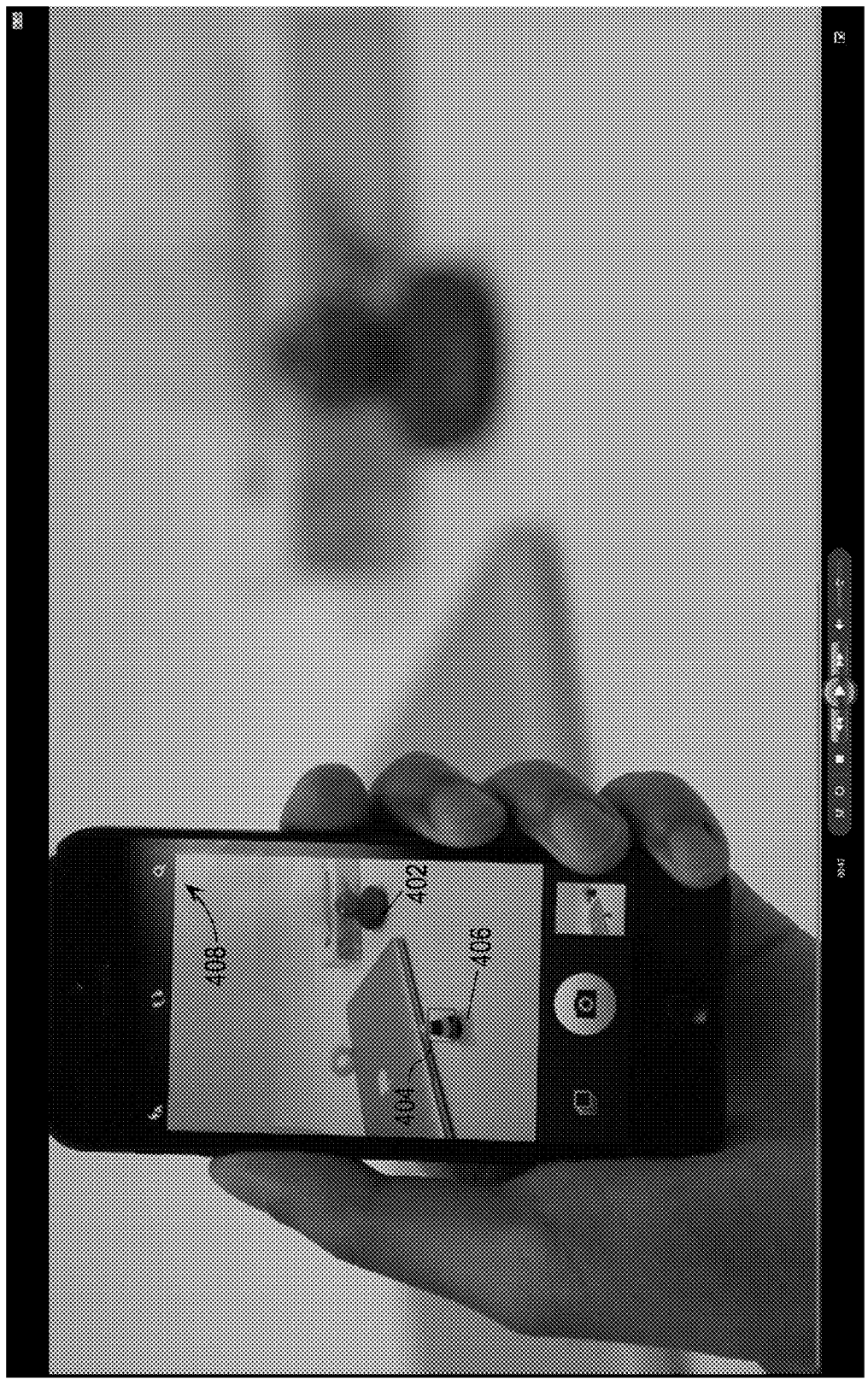

In FIG. 4D, after repeating the process, the traffic cone 406 is determined to be the new particular candidate object of interest, i.e., the candidate object of interest that is most likely to be of interest to the user. As described in more detail hereinafter, this may be determined based upon the traffic cone 406 having a higher score than the rubber duck 402. Passive auto focusing has been performed at the location of the traffic cone 406 and the graphical symbol 404 is moved from the rubber duck 402 to the traffic cone 406 to visually indicate to the user that the point of focus is now at the location of the traffic cone 406.

Figure 4E:
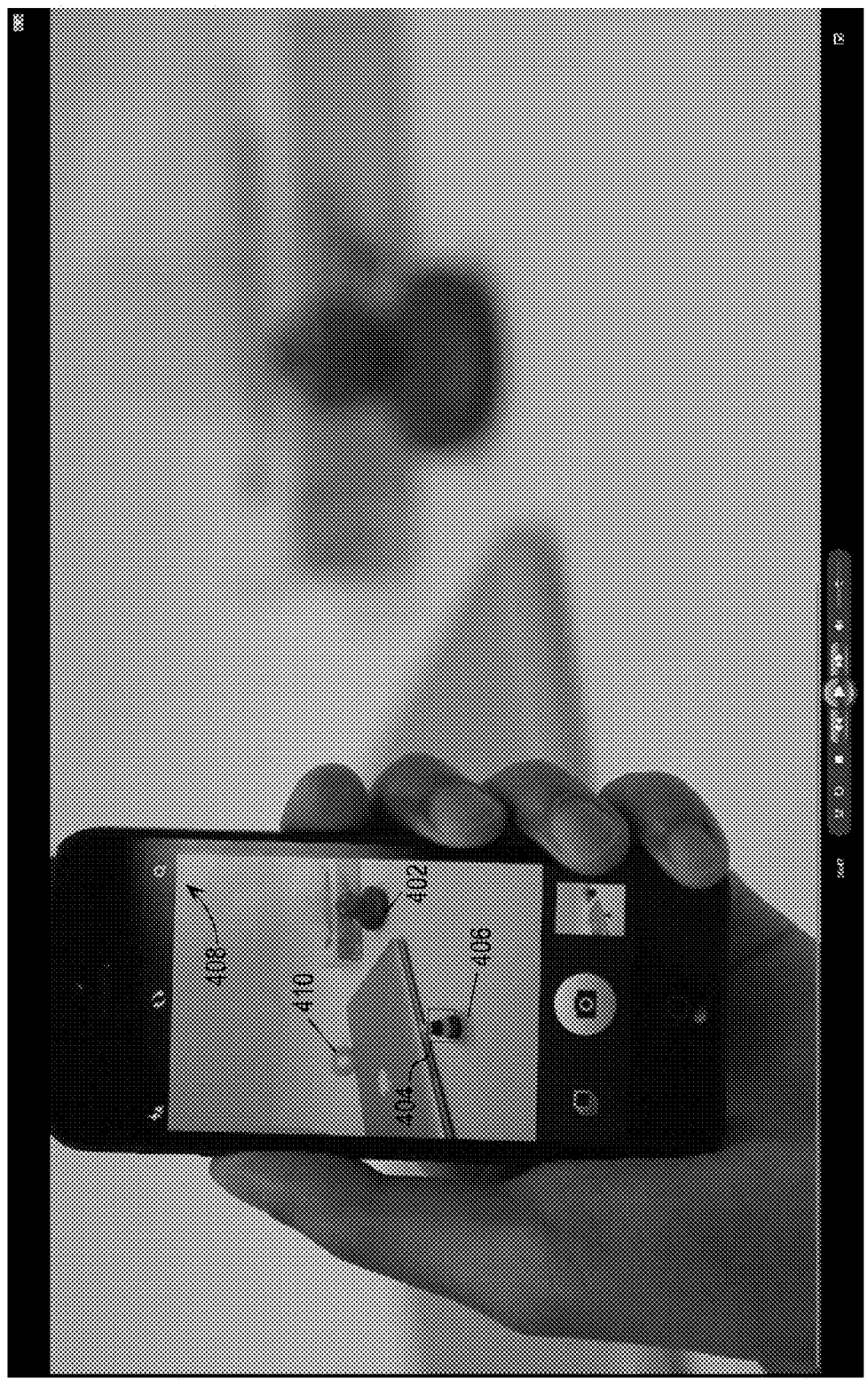
Figure 4F:
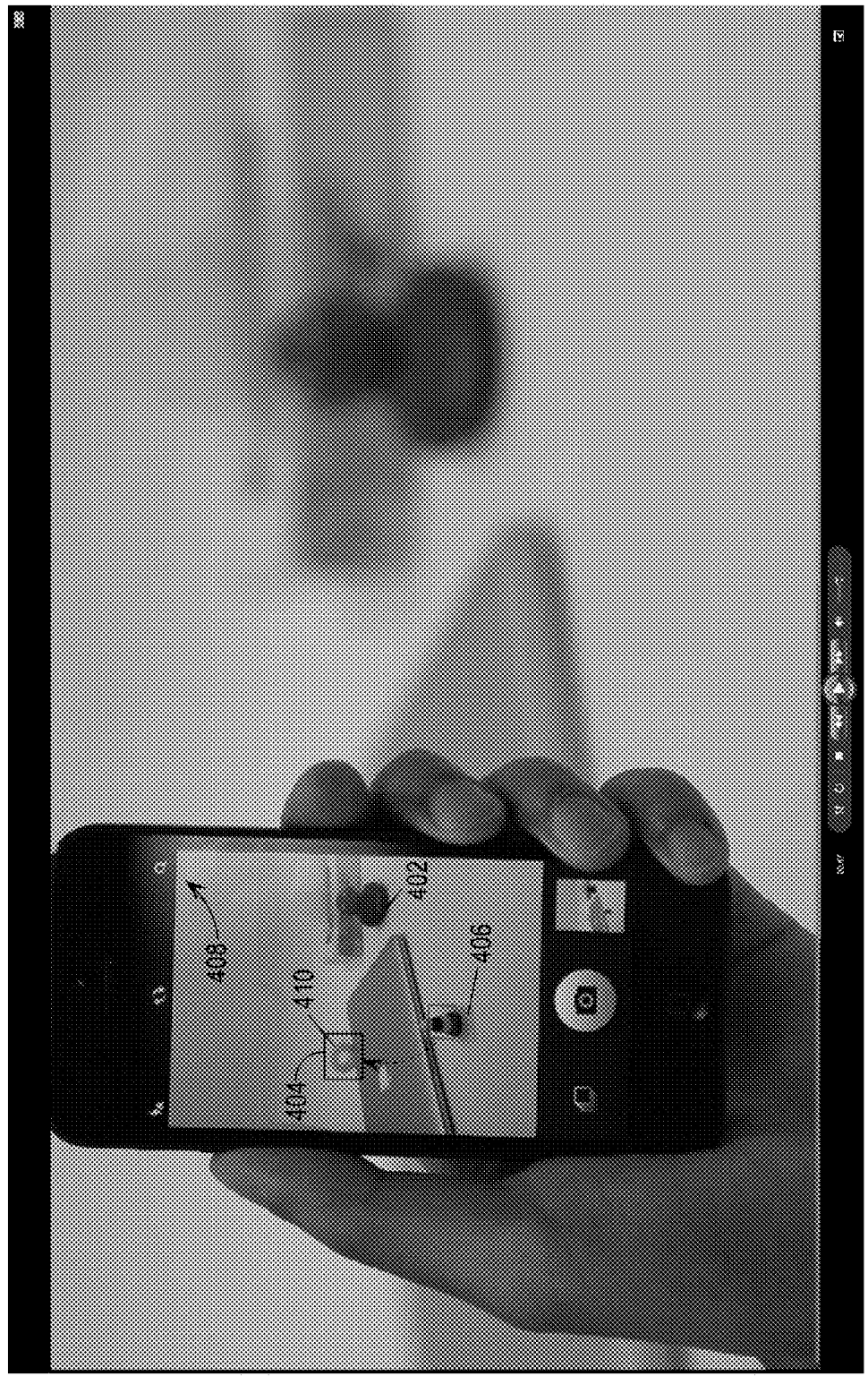

According to one embodiment, a user may select another location on the display of the mobile device as the point of focus for the camera. As depicted in FIG. 4E, a user may select the roll of tape 410 as the point of focus, for example, by touching the screen of the smartphone using a finger or a stylus at the location of the roll of tape 410. In response to the user selection, passive auto focusing is performed at the location selected by the user. As depicted in FIG. 4F, the graphical symbol 404 is moved from the traffic cone 406 to the roll of tape 410, to visually indicate to the user that the point of focus for the camera of the smartphone has moved to the location selected by the user. Embodiments are not limited to a user selecting a particular visible object as a new point of focus, as depicted and described in the aforementioned example, and users may select any location on the screen of the mobile device as a new point of focus and passive auto focusing will be performed at that location.

IV. Determining Candidate Objects of Interest

According to one embodiment of the invention, image data is analyzed to identify areas, within the corresponding image, referred to herein as "bounding boxes." Each bounding box corresponds to a candidate object of interest as described herein. Each bounding box is evaluated based upon color contrast, edge density and superpixel straddling cues and a score is determined for each of these cues. Bayesian classification is then used to sort the bounding boxes and the bounding box with the highest score is selected as the particular, i.e., the best, candidate object of interest.

FIG. 5 is a flow diagram 500 that depicts an approach for evaluating image data to determine a plurality of candidate objects of interest and select a particular object of interest from the plurality of candidate objects of interest. In step 502, a set of bounding boxes is determined. The determination of the set of bounding boxes may include several sub-steps. For example, the image data may initially be down sampled, for example to 256×256, to reduce the computational costs required to process the image data. According to one embodiment, a saliency detection technique is used to identify the most prominent portions of the image. One example of such a saliency detection technique is described in "Saliency Detection: A Spectral Residual Approach," by Xiaodi Hou and Liquing Zhang, the contents of which are incorporated herein in their entirety for all purposes. In this example, a saliency map is determined based upon statistical singularities that are particular to the image, referred to as the spectral residual, of an FFT on the image, where the spectral residual is obtained by removing the averaged spectrum information from the original log spectrum information. The spectral residual can be said to contain the non-trivial, unexpected or unique portions of the image. An FFT-based approach is less computationally expensive compared to other approaches, such as segmentation approaches. Saliency detection is scale-dependent, so according to one embodiment, the approach is implemented using different scales and non-maxima suppression is performed on local maxima and N number of objects in the saliency map are selected as bounding boxes. The value of N may vary depending upon computational resources and constraints of a particular implementation.

In step 504, a first or next bounding box is selected for processing. In step 506, a color contrast score is determined for the selected bounding box. Color contrast is a useful cue, because unique objects tend to have a different color distribution than their immediate surroundings. The color contrast score generally indicates the extent to which a bounding box is dissimilar in color with respect to its immediate surroundings and is computed as the Chi-square distance between the LAB histogram of the bounding box and the LAB histogram of the immediate surroundings. Thus, a bounding box that completely surrounds a unique object in an image would have a higher color contrast score than a bounding box where half of the bounding box included half of the unique object and the other half of the bounding box included the surrounding area. A bounding box that tightly surrounds the unique object would have the highest color contrast score. An example technique for determining a color contrast score for a bounding box is described in "Measuring the Objectiveness of Image Windows," by Bogdan Alexe, Thomas Deselaers and Vittorio Ferrari, the entire contents of which are incorporated herein by reference for all purposes.

In step 508, an edge density score is determined for the selected bounding box. Edge density generally indicates the closed boundary characteristics of objects. An example technique for determining an edge density score for a bounding box is described in "Measuring the Objectiveness of Image Windows," by Bogdan Alexe, Thomas Deselaers and Vittorio Ferrari.

In step 510, a superpixel straddling score is determined for the selected bounding box. Like edge density, superpixel straddling is also a way to evaluate the closed boundary characteristics of objects. In general, since all pixels in a superpixel ideally belong to the same object, a bounding box that straddles a superpixel will receive a lower superpixel score than a bounding box that completely contains a superpixel. An example technique for determining a superpixel score is described in "Measuring the Objectiveness of Image Windows," by Bogdan Alexe, Thomas Deselaers and Vittorio Ferrari.

In step 512, a determination is made whether more bounding boxes need to be processed. If so, then control returns to step 504. If not, then in 514, Bayesian cue integration is used to combine the color contrast, edge density and superpixel straddling cue scores and sort the bounding boxes and select the bounding box with the highest score as the particular, i.e., the best, candidate object of interest. As one example, the technique described in "Measuring the Objectiveness of Image Windows," by Bogdan Alexe, Thomas Deselaers and Vittorio Ferrari may be used.

Embodiments described herein for identifying objects of interest in images are effective for identifying a wide variety of object types without necessarily having any prior knowledge of what types of objects an image might contain. Example object types include, without limitation, man-made objects, facial and other human features and natural objects. In addition, the use of multiple types of cues makes the approach effective for different types of images, for example, images that include man-made objects with dominant edges, as well as images of natural landscapes that include fewer (or no) objects with dominant edges. Furthermore, the approach may be performed prior to focusing the mobile device camera or capturing a focused image.

The aforementioned approach may be performed continuously so that when a mobile device is operating in a camera mode, the best candidate object of interest is continuously re-determined and used as the point of focus for passive auto focusing. In some situations however, for example on mobile devices with limited computational resources, this may cause a delay in selecting new points of focus and may lead to an unfavorable user experience. For example, the point of focus may begin to lag behind as a user moves or reorients the mobile device. As previously described herein, the aforementioned approach may instead be performed periodically or in response to user input. In addition, the approach itself may be adapted for applications where limited computational resources are available. For example, the number of bounding boxes may be reduced. Also, different combinations of cues may be used to reduce the consumption of computational resources. For example, the edge density score may not be used. Other embodiments may include different combinations of cues.

V. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more mobile devices that may be special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 processing instructions stored in main memory 606. Such instructions may be read into main memory 606 from another computer-readable medium, such as storage device 610. Processing of the instructions contained in main memory 606 by processor 604 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 604. For example, the instructions may initially be stored on a storage medium of a remote computer and transmitted to computer system 600 via one or more communications links. Bus 602 carries the data to main memory 606, from which processor 604 retrieves and processes the instructions. The instructions received by main memory 606 may optionally be stored on storage device 610 either before or after processing by processor 604.

Computer system 600 also includes a communication interface 618 coupled to bus 602. Communication interface 618 provides a communications coupling to a network link 620 that is connected to a local network 622. For example, communication interface 618 may be a modem to provide a data communication connection to a telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be processed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A mobile device comprising:
one or more processors;
one or more memories communicatively coupled to the one or more processors;
a camera;
a display for displaying images to a user and for receiving user input from the user; and
a photo application executing on the mobile device and being configured to:
cause the camera to acquire an image represented by image data,
process the image data to identify a plurality of candidate objects of interest in the image by:
identifying a plurality of prominent regions within the image,
assigning a plurality of bounding boxes to the plurality of prominent regions within the image, and
for each bounding box from the plurality of bounding boxes, determining one or more of a color contrast score, an edge density score, or a superpixel straddling score,
select a particular candidate object of interest from the plurality of candidate objects of interest based upon the scores for the plurality of bounding boxes, wherein the particular candidate object of interest has a location other than the center of the display, and
cause passive auto focusing to be performed at the location other than the center of the display of the particular candidate object of interest.

2. The mobile device of claim 1, wherein the photo application executing on the mobile device is further configured to cause the camera to acquire a focused image after the passive auto focusing is completed.

3. The mobile device of claim 1, wherein the photo application executing on the mobile device is further configured to cause a candidate object of interest symbol to be displayed on the display at the location other than the center of the display for the particular candidate object of interest.

4. The mobile device of claim 1, wherein the photo application executing on the mobile device is further configured to, in response to a user selection of a second candidate object of interest from the plurality of candidate objects of interest, wherein the second candidate object of interest is different than the particular candidate object of interest:
cause a candidate object of interest symbol to be moved on the display from the location other than the center of the display for the particular candidate object of interest to a location of the second candidate object of interest, and
cause passive auto focusing to be performed at the location of the second candidate object of interest.

5. The mobile device of claim 1, wherein the photo application executing on the mobile device is further configured to, in response to one or more of user input that indicates a user interest in a particular location on the image that is different that the location for the particular candidate object of interest or an expiration of time:
cause the camera to acquire a second image represented by second image data, wherein the second image is different than the image and the second image data is different than the image data,
process the second image data to identify a second plurality of candidate objects of interest in the second image,
select a second particular candidate object of interest from the second plurality of candidate objects of interest, wherein the second particular candidate object of interest is different than the particular candidate object of interest and wherein the second particular candidate object of interest has a location that is both other than the center of the display and different than the location of the particular candidate object of interest, and
cause passive auto focusing to be performed at the location of the second particular candidate object of interest that is both other than the center of the display and different than the location of the particular candidate object of interest.

6. The mobile device of claim 1, wherein the photo application executing on the mobile device is further configured to identify the plurality of prominent regions within the image by generating a saliency map based upon the spectral residual of an FFT on the image data.

7. One or more non-transitory computer-readable media storing instructions which, when processed by one or more processors, cause:
a photo application executing on a mobile device to:
cause a camera of the mobile device to acquire an image represented by image data,
process the image data to identify a plurality of candidate objects of interest in the image by:
identifying a plurality of prominent regions within the image,
assigning a plurality of bounding boxes to the plurality of prominent regions within the image, and
for each bounding box from the plurality of bounding boxes,
determining one or more of a color contrast score, an edge density score, or a superpixel straddling score,
select a particular candidate object of interest from the plurality of candidate objects of interest based upon the scores for the plurality of bounding boxes, wherein the particular candidate object of interest has a location other than the center of the display, and
cause passive auto focusing to be performed at the location other than the center of the display of the particular candidate object of interest.

8. The one or more non-transitory computer-readable media of claim 7, wherein the photo application executing on the mobile device further causes the camera to acquire a focused image after the passive auto focusing is completed.

9. The one or more non-transitory computer-readable media of claim 7, wherein the photo application executing on the mobile device further causes a candidate object of interest symbol to be displayed on the display at the location other than the center of the display for the particular candidate object of interest.

10. The one or more non-transitory computer-readable media of claim 7, wherein the photo application executing on the mobile device further causes, in response to a user selection of a second candidate object of interest from the plurality of candidate objects of interest, wherein the second candidate object of interest is different than the particular candidate object of interest:
cause a candidate object of interest symbol to be moved on the display from the location other than the center of the display for the particular candidate object of interest to a location of the second candidate object of interest, and
cause passive auto focusing to be performed at the location of the second candidate object of interest.

11. The one or more non-transitory computer-readable media of claim 7, wherein the photo application executing on the mobile device, in response to one or more of user input that indicates a user interest in a particular location on the image that is different that the location for the particular candidate object of interest or an expiration of time:
causes the camera to acquire a second image represented by second image data, wherein the second image is different than the image and the second image data is different than the image data,
process the second image data to identify a second plurality of candidate objects of interest in the second image,
select a second particular candidate object of interest from the second plurality of candidate objects of interest, wherein the second particular candidate object of interest is different than the particular candidate object of interest and wherein the second particular candidate object of interest has a location that is both other than the center of the display and different than the location of the particular candidate object of interest, and
causes passive auto focusing to be performed at the location of the second particular candidate object of interest that is both other than the center of the display and different than the location of the particular candidate object of interest.

12. The one or more non-transitory computer-readable media of claim 7, wherein the photo application executing on the mobile device identifies the plurality of prominent regions within the image by generating a saliency map based upon the spectral residual of an FFT on the image data.

13. A computer-implemented method comprising:
a photo application executing on a mobile device to:
cause a camera of the mobile device to acquire an image represented by image data,
process the image data to identify a plurality of candidate objects of interest in the image by:
identifying a plurality of prominent regions within the image,
assigning a plurality of bounding boxes to the plurality of prominent regions within the image, and
for each bounding box from the plurality of bounding boxes, determining one or more of a color contrast score, an edge density score, or a superpixel straddling score,
select a particular candidate object of interest from the plurality of candidate objects of interest based upon the scores for the plurality of bounding boxes, wherein the particular candidate object of interest has a location other than the center of the display, and
cause passive auto focusing to be performed at the location other than the center of the display of the particular candidate object of interest.

14. The computer-implemented method of claim 13, wherein the photo application executing on the mobile device further causes the camera to acquire a focused image after the passive auto focusing is completed.

15. The computer-implemented method of claim 13, wherein the photo application executing on the mobile device further causes a candidate object of interest symbol to be displayed on the display at the location other than the center of the display for the particular candidate object of interest.

16. The computer-implemented method of claim 13, wherein the photo application executing on the mobile device further causes, in response to a user selection of a second candidate object of interest from the plurality of candidate objects of interest, wherein the second candidate object of interest is different than the particular candidate object of interest:
cause a candidate object of interest symbol to be moved on the display from the location other than the center of the display for the particular candidate object of interest to a location of the second candidate object of interest, and
cause passive auto focusing to be performed at the location of the second candidate object of interest.

17. The computer-implemented method of claim 13, wherein the photo application executing on the mobile device, in response to one or more of user input that indicates a user interest in a particular location on the image that is different that the location for the particular candidate object of interest or an expiration of time:

causes the camera to acquire a second image represented by second image data, wherein the second image is different than the image and the second image data is different than the image data, process the second image data to identify a second plurality of candidate objects of interest in the second image, select a second particular candidate object of interest from the second plurality of candidate objects of interest, wherein the second particular candidate object of interest is different than the particular candidate object of interest and wherein the second particular candidate object of interest has a location that is both other than the center of the display and different than the location of the particular candidate object of interest, and causes passive auto focusing to be performed at the location of the second particular candidate object of interest that is both other than the center of the display and different than the location of the particular candidate object of interest.

18. The computer-implemented method of claim 13, wherein the photo application executing on the mobile device identifies the plurality of prominent regions within the image by generating a saliency map based upon the spectral residual of an FFT on the image data.

* * * * *